United States Patent [19]

Porro

[11] 4,071,307

[45] Jan. 31, 1978

[54] APPARATUS FOR MAKING CHIPS OF THERMOPLASTIC MATERIAL

[76] Inventor: Luigi Porro, via Torino 24-26, Villanova Canavese, Turin, Italy

[21] Appl. No.: 639,376

[22] Filed: Dec. 10, 1975

[30] Foreign Application Priority Data

Dec. 16, 1974 Italy .................................. 70631/74

[51] Int. Cl.² ................................................ B29F 3/04
[52] U.S. Cl. ................................. 425/72 R; 425/311; 425/382 R; 425/464
[58] Field of Search ............... 264/148, 149, 142, 143, 264/150; 425/311, 313, 72, 377, 382, 464, DIG. 230, 463; 83/167, 663

[56] References Cited

U.S. PATENT DOCUMENTS

| 2,914,005 | 11/1959 | Gorozpe | 425/311 |
|---|---|---|---|
| 3,177,820 | 4/1965 | Pazar et al. | 425/72 |
| 3,304,578 | 2/1967 | Clute | 425/382 |
| 3,415,917 | 12/1968 | Watanabe et al. | 264/142 |
| 3,564,650 | 2/1971 | Irving | 425/72 |
| 3,578,740 | 5/1971 | Redding et al. | 425/377 X |
| 3,727,308 | 4/1973 | Ross | 425/311 X |

*Primary Examiner*—Robert L. Spicer, Jr.
*Assistant Examiner*—Mark Rosenbaum
*Attorney, Agent, or Firm*—Bucknam and Archer

[57] ABSTRACT

A die for extruding filaments from molten plastic material such as polyethylene or polypropylene is heated until steady extrusion conditions are reached. The direct heating is then stopped, so that the die is only partially heated from the molten material while it is extruded. The extruded filaments are sheared by a blade interacting with the die. The resulting chips are cool enough for flowing to an outflow hopper without sticking to one another or to the blade. Sticking is further prevented by maintaining a strong cooling air stream within the hopper and around the blade and by making the extrusion holes in the die diverge at their output ends and by arranging them near the periphery of the die for maximum mutual distance.

1 Claim, 6 Drawing Figures

APPARATUS FOR MAKING CHIPS OF THERMOPLASTIC MATERIAL

This invention relates to a process for making pellets of a thermoplastic material such as polyethylene or polypropylene and the like, and also relates to an apparatus for implementing the process.

BACKGROUND OF THE INVENTION

It is known to extrude a molten mass of the thermoplastic material into filaments, to lead the filaments through a liquid coolant for stiffening them, and to cut the stiffened filaments into short cylindrical stumps or chips by means of shears. However, because of the softness of the warm extruded material, and due to non-uniformity of the sizes of the holes in the die and of the cooling rates of the several filaments, differences in length are bound to arise among the filaments. These differences are either absorbed in the cutting step, thus leading to non-uniformity in the size and shape of the chips, or form loops of increasing length, thus causing malfunctions of the chip-making machine, which malfunctions eventually have to be cured by stopping the machine for removing the loops.

There have been attempts in the past to overcome the above inconveniences by avoiding the cooling step and cutting the filaments into chips directly at the exit from the die. These attempts, however, have only been successful with quickly stiffening materials such as polyvinyl chloride. With materials such as polyethylene and polypropylene, on the other hand, the chips, if cut directly at the exit of the die, are soft and sticky and tend to lump together and stick to the shearing blade and to the walls of the surrounding enclosure.

This invention therefore has the object of providing a process for making chips of thermoplastic material such as polyethylene or polypropylene and the like, by means of which the cooling step through a liquid coolant may be dispensed with without incurring in the above mentioned drawbacks.

A further object of the invention is to achieve a high degree of uniformity in the manufacture of chips of thermoplastic material such as polyethylene and polypropylene.

A further object is to provide a chip-making apparatus of the above mentioned kind, which is more compact and more easily operated than prior apparatus.

SUMMARY OF THE INVENTION

In order to achieve the above and other objects and advantages, such as will appear in the following, the invention provides a process for making chips of a thermoplastic material such as polyethylene or polypropylene, including a step of extrusion of filaments of molten material through a die from a molten bulk of material, the process further comprising the following steps; directly heating the die to the operating temperature for initiating the extrusion; stopping the direct heating of the die when steady extrusion conditions are reached; shearing chips of material from the extruded filaments by applying a rotating shearing blade against the die; collecting the sheared chips in a hopper beneath the shearing blade while maintaining a strong air stream in the hopper and around the blade.

The invention also provides an apparatus for making chips of a thermoplastic material such as polyethylene or polypropylene, comprising: a die adapted to extrude filaments and have heating means; a rotatable shearing tool having one shearing blade, adapted to interact with the die for shearing the filaments into chips; an enclosure surrounding the shearing tool and the die, for leading the chips away from the shearing area and toward an outflow aperture; a hopper placed beneath the outflow aperture of the enclosure for collecting the sheared material; and a rotatable impeller cooperating with the hopper and adapted to generate an air stream into the hopper and the enclosure.

DETAILED DESCRIPTION

A preferred embodiment of an apparatus according to the invention will now be described, by way of example, with reference to the attached drawings, wherein.

Figure 1:
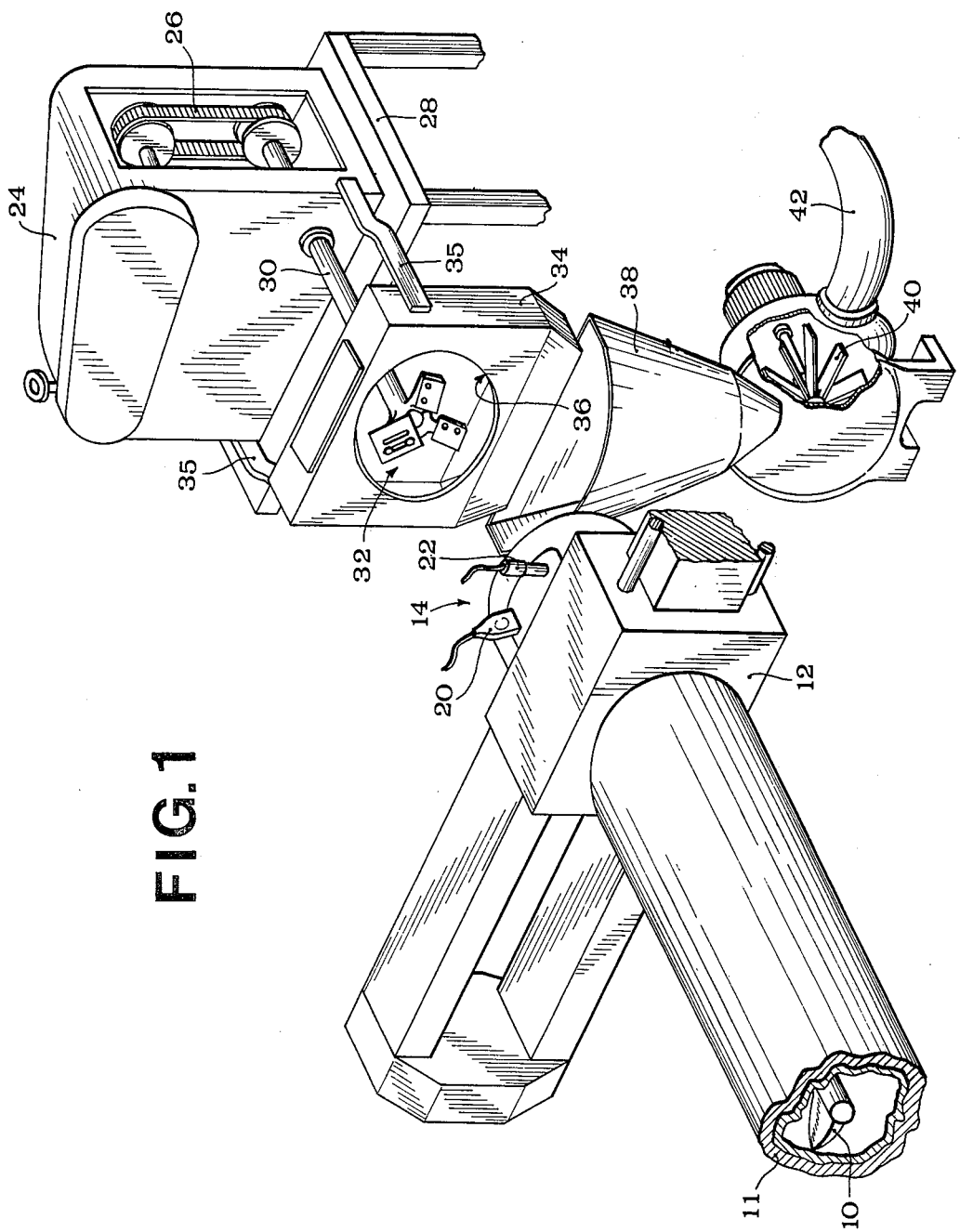
FIG. 1 is a perspective view of the preferred embodiment of the apparatus according to the invention.
Figure 4:
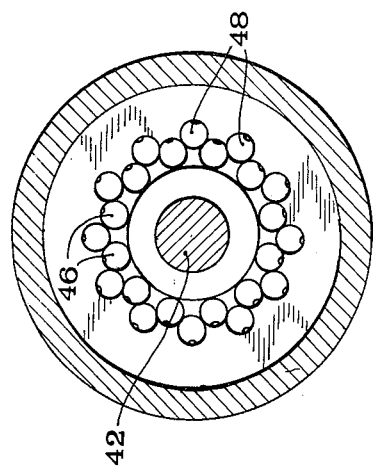
FIG. 4 is a cross-section view taken along the line IV—IV of FIG. 3.
Figure 2:
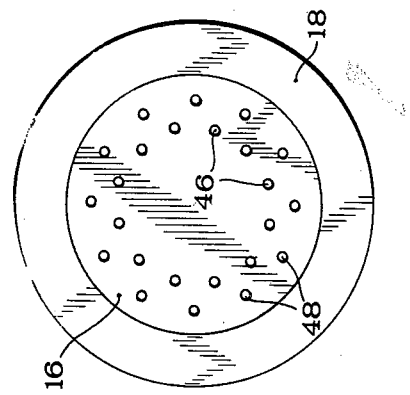
FIG. 2 is a front view of an extruder head of the apparatus of FIG. 1.
Figure 3:
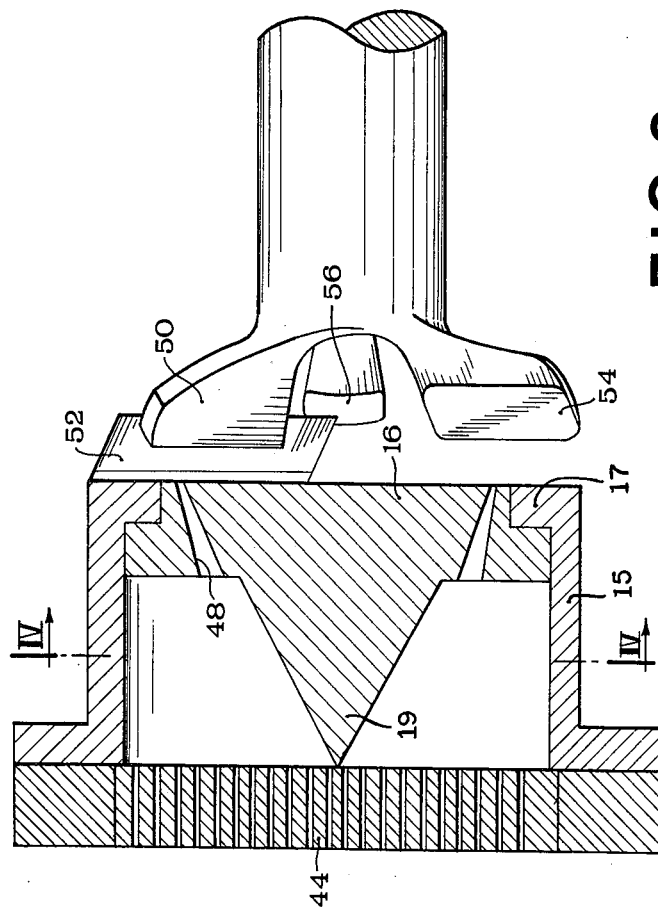
FIG. 3 is a longitudinal cross-section view of the extruder head of FIG. 2 with a shearing tool in operative position.

With reference to FIG. 1, a screw feeder 10 provided with a surrounding electric heater 11 is adapted to feed molten polyethylene or polypropylene from a supply not shown to a breaker stage 12 provided with rechangeable breaker plates known per se, which in turn feeds an extruder head 14 (see also FIGS. 2, 3 and 4). Extruder head 14 comprises a die 16 surrounded by an electric heater 18, known per se, having an electric supply cable 20 and a thermometric probe 22, both connected to a supply unit (not shown) for energizing heater 18 under control of thermometric probe 22 so as to maintain the extruder head at a desired temperature.

The apparatus further comprises a power unit 24, including a motor (not visible in the figures) and a speed variator 26. Power unit 24 is mounted on a support member 28, adapted to move towards and away from extruder head 14, by means not shown in the figures. An output shaft 30 of the power unit carries a shearing tool 32, further described in the following, which tool is surrounded by an enclosure 34 supported on brackets 35 and having an aperture 36 in front of the shearing tool. The aperture 36 is slightly larger than the extruder head 14, and the aperture 36, the head 14 and the shaft 30 are coaxial, so that when the support member 28 is moved towards the head 14, the head 14 can be partially received within the aperture and the shearing tool 32 can abut against the face of the die for operative interaction with it.

Enclosure 34 opens at the bottom into a hopper 38 leading the sheared material to an impeller 40, which is adapted to generate an air stream so as to draw the chips along a pipe 42 for carrying the material to a packing station (not visible in FIG. 1), described later with reference to FIG. 6.

With reference to FIGS. 2, 3 and 4, the extruder head 14 will now be described. The electric heater 18 is not shown in these figures for clarity.

The extruder head 14 comprises a cylinder 15 having a die 16 received in a recess 17. The die has a mandrel 19 touching the breaker plate 44 at its apex.

The die 16 has twentyfour extrusion holes arranged in two circular arrays 46, 48, each having twelve holes, near the periphery of the die. The holes in the arrays 46, 48 are displaced by half an angular pitch with respect to each other. As best seen in FIG. 3, the direction along which the material is extruded through the holes in the die is not parallel to the axis of the head, but rather forms an angle with that axis, so that the filaments extruded on both arrays of holes diverge along respective imaginary cones at the exit from the die, the cones having their apexes somewhere upstream on the die axis. Each of the holes 46, 48 is conical in shape and has a diameter of about 2 mm at its exit end.

Figure 5:
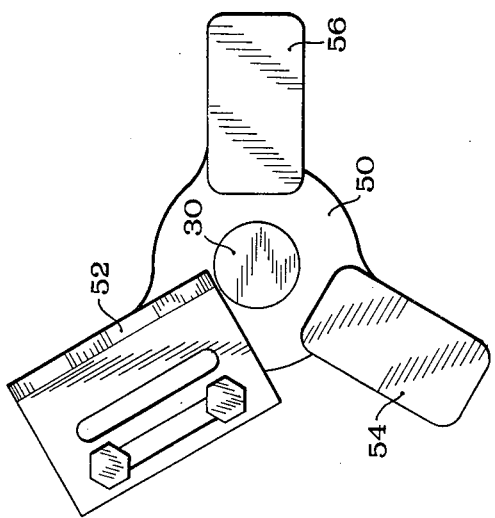
FIG. 5 is an enlarged front view of the shearing tool of the apparatus.

With reference to FIG. 5, the shearing tool 32 has a blade holder 50 arranged for supporting a shearing blade 52 having its cutting edge arranged radially and perpendicularly to the tool shaft, and further has two radial arms 54, 56 at equal angles with respect to each other and to the blade 50.

The process according to the invention will now be explained in more detail by reference to the operation of the above described apparatus.

Assuming that electric heater 11 has been turned on for melting the plastic material contained in the screw feeder 10, electric heater 18 associated with the extruder head 14 is then also turned on for bringing the die, together with the breaker plates 12, to the operating temperature, as conventionally desirable. The extrusion is then initiated, and when a steady extrusion condition has been reached, electric heater 18 is turned off, thus letting the die temperature drop. The die, however, is still imparted a degree of indirect heating by the molten material fed to it through the breaker plate. Shearing tool 32 is then rotated and moved toward the die until the cutting edge of the blade abuts the die face and starts shearing the emerging filaments into chips. Because of the lowered temperature of the die and of the arrangement of the extrusion holes, making for maximum distance among the emerging filaments, the sheared chips have little or no tendency to clump together or to the other parts, such as the shearing blade. Moreover, the shearing blade tends to hurl away the chips, so that they hit radial arms 54, 56 and rebound against the walls of enclosure 34, eventually falling into hopper 38. The chips are further cooled down by the air streams prevailing in the hopper by action of the impeller 40 and are carried along pipe 42 to the packing station (shown in FIG. 6).

The revolving speed of the shearing tool varies with the plastic material and the die size, and also with other factors such as the conditions of the environment and the particular specifications of the apparatus. A typical speed is about 1000 rev/min, but it may be varied in a broad range and should be determined by trial in the particular operating conditions.

Figure 6:
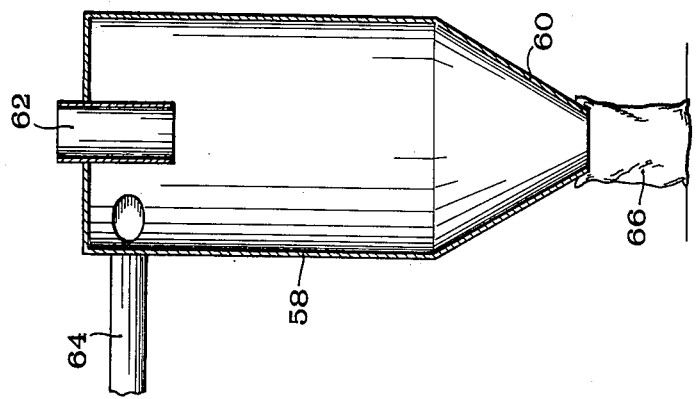
FIG. 6 is a cross-section view of a cooling cyclone used with the apparatus of FIG. 1.

FIG. 6 shows a cooling cyclone which is preferably used in the packing station. The cyclone comprises a hollow, vertical cylinder 58, terminating at its bottom into a hopper 60 and having a ventilation aperture 62 at its top. A pipe 64, connected with pipe 42 of FIG. 1, opens tangentially into the top portion of cylinder 58. During operation of the apparatus, a stream of air and chips is projected into the cyclone from the pipe 64, and the chips whirl down into the hopper while they are further cooled down. At the bottom of the hopper a bag 66 may be attached for collection and packing the chips. A shutter (not shown) is preferably provided near the bottom aperture of the hopper 60 for momentarily shutting off the outflow of chips while a filled up bag is replaced with an empty one.

While a preferred embodiment of the invention has been described above, it will be understood that other embodiments can be devised by persons skilled in the art, within the scope of the appended claims.

I claim:

1. An apparatus for making chips of a thermoplastic material such as polyethylene or polypropylene, comprising:
    a die for extruding filaments and having heating means;
    a rotatable shearing tool having one shearing blade, operatively associated with the die for shearing the filaments into chips;
    an enclosure surrounding the shearing tool and the die, for leading the chips away from the shearing area and toward an outflow aperture;
    a hopper placed beneath the outflow aperture of the enclosure for collecting the chips;
    a rotatable impeller located immediately adjacent the lower outlet end of said hopper and cooperating with the hopper for generating an air stream into the hopper and the enclosure, said air stream cooling said shearing blade, and wherein the die comprises a mandrel having a flat plate-like portion and a rearwardly extending conical apex, a cylinder housing the mandrel and a breaker plate engaging the apex of the mandrel, said cylinder defining an extrusion chamber between its inner surface and the conical apex of said mandrel, said flat plate-like portion having extrusion holes in at least two coaxial circular arrays near the periphery thereof, the arrays being displaced by half an angular pitch with respect to each other, said extrusion holes extending at an angle relative to the axis of the die in a radial plane from a point near the center of said extrusion chamber to a point near the periphery of said flat plate-like portion and tapering from said extrusion chamber to said flat plate-like portion.

* * * * *